US012651676B2

(12) United States Patent
Huang et al.

(10) Patent No.: US 12,651,676 B2
(45) Date of Patent: Jun. 9, 2026

(54) RAY PROTECTION DEVICE AND RADIATION INSPECTION SYSTEM

(71) Applicant: NUCTECH COMPANY LIMITED, Beijing (CN)

(72) Inventors: Wei Huang, Beijing (CN); Junping Shi, Beijing (CN); Feng Wang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 351 days.

(21) Appl. No.: 18/690,261

(22) PCT Filed: Aug. 16, 2022

(86) PCT No.: PCT/CN2022/112704
§ 371 (c)(1),
(2) Date: Mar. 7, 2024

(87) PCT Pub. No.: WO2023/035873
PCT Pub. Date: Mar. 16, 2023

(65) Prior Publication Data
US 2025/0140431 A1     May 1, 2025

(30) Foreign Application Priority Data

Sep. 9, 2021    (CN) .......................... 202111055293.X

(51) Int. Cl.
*G21F 5/14*        (2006.01)
*G01V 5/22*        (2024.01)
(Continued)

(52) U.S. Cl.
CPC ................ *G21F 5/14* (2013.01); *G01V 5/222* (2024.01); *G01V 5/232* (2024.01); *G21F 5/04* (2013.01)

(58) Field of Classification Search
CPC .. G21F 5/14; G21F 5/04; G01V 5/232; G01V 5/222
See application file for complete search history.

(56) References Cited

U.S. PATENT DOCUMENTS

| 6,058,158 A | 5/2000 | Eiler |
| 2014/0185753 A1 | 7/2014 | Azmi et al. |
| (Continued) |

FOREIGN PATENT DOCUMENTS

| CN | 1197209 A | 10/1998 |
| CN | 101953234 A | 1/2011 |
| (Continued) |

OTHER PUBLICATIONS

WO 2022/143175 A1 (Year: 2022).*
(Continued)

*Primary Examiner* — Nicole M Ippolito
(74) *Attorney, Agent, or Firm* — Kilpatrick Townsend & Stockton LLP

(57)        ABSTRACT

The present disclosure provides a ray protection device and a radiation inspection system. The ray protection device comprises: a mobile bearing device, including a vehicle frame and a traveling device supporting the vehicle frame to drive the vehicle frame to travel in a first direction; and a protection wall, arranged on the vehicle frame and including a movable wall which is movable relative to the vehicle frame. The movable wall has a shielding position and a retracting position; at the shielding position of the movable wall, the protection wall has first projection area in a vertical plane parallel to the first direction; and at the retracting position of the movable wall, the protection wall has second projection area in the vertical plane, where the first projection area is larger than the second projection area.

19 Claims, 4 Drawing Sheets

(51) Int. Cl.
G01V 5/222 (2024.01)
G21F 5/04 (2006.01)

(56) References Cited

U.S. PATENT DOCUMENTS

| | | | |
|---|---|---|---|
| 2018/0259673 A1 | 9/2018 | Cui et al. | |
| 2019/0246995 A1 | 8/2019 | Egolf et al. | |

FOREIGN PATENT DOCUMENTS

| | | |
|---|---|---|
| CN | 204895648 U | 12/2015 |
| CN | 105301669 A | 2/2016 |
| CN | 105379425 A | 3/2016 |
| CN | 106229022 A | 12/2016 |
| CN | 207439972 U | 6/2018 |
| CN | 109256228 A | 1/2019 |
| CN | 209168756 U | 7/2019 |
| CN | 209327591 U | 8/2019 |
| CN | 212341478 U | 1/2021 |
| CN | 214201802 U | 9/2021 |
| EP | 2952068 B1 | 12/2020 |
| KR | 100926181 B1 | 11/2009 |
| KR | 101187050 B1 | 9/2012 |
| WO | 2009088706 A2 | 7/2009 |

OTHER PUBLICATIONS

The Extended European Search Report issued in European corresponding application No. 22866347.2 mailed on 1 Aug. 7, 2025, 9 pages.
IRS received in PCT/CN2022/112704; mailed Nov. 15, 2022.
First OA received in CN Application No. 202111055293.X; mailed Aug. 11, 2023.
Second OA received in Application No. 202111055293.X; mailed Dec. 11, 2023.
Grant Notice received in Application No. 202111055293.X; mailed Apr. 15, 2024.

* cited by examiner

RAY PROTECTION DEVICE AND RADIATION INSPECTION SYSTEM

CROSS-REFERENCES TO RELATED APPLICATIONS

The present disclosure is a national phase application of International Application No. PCT/CN2022/112704, filed on Aug. 16, 2022, which claims priority to Chinese Patent Application No. 202111055293.X, filed on Sep. 9, 2021, the entire contents of all of which are incorporated herein by reference.

FIELD

The present disclosure relates to the field of radiation inspection, and in particular, to a ray protection device and a radiation inspection system.

BACKGROUND

In a related art, a mobile radiation inspection system for performing radiation inspection on goods and/or vehicles does not have a protection device when inspecting inspected goods or vehicles. Therefore, an occupied site is required to be large enough to reduce ray radiation by the space span of the site, to ensure the personnel safety.

SUMMARY

One embodiment of the present disclosure is to provide a ray protection device and a radiation inspection system, to solve the problem that the radiation inspection system is required to occupy a large inspection site.

One embodiment of the present disclosure provides a ray protection device, including:

a mobile bearing device, including a vehicle frame and a traveling device supporting the vehicle frame to drive the vehicle frame to travel in a first direction; and a protection wall, arranged on the vehicle frame and including a movable wall which is movable relative to the vehicle frame and has a shielding position and a retracting position; at the shielding position of the movable wall, the protection wall has first projection area in a vertical plane parallel to the first direction; and at the retracting position of the movable wall, the protection wall has second projection area in the vertical plane; and the first projection area is larger than the second projection area.

In some embodiments, the ray protection device further includes a wall driving device; the wall driving device includes a wall driving part which is mounted on the vehicle frame and in driving connection with the movable wall; and the wall driving part is configured to drive the movable wall to switch between the shielding position and the retracting position.

In some embodiments, the movable wall includes two or more movable parts; the wall driving device includes two or more wall driving parts arranged corresponding to the two or more movable parts; and each of the wall driving parts drives the corresponding movable part to act.

In some embodiments, the movable wall includes two or more movable parts extending in the first direction; and a height and/or a thickness of at least one of the movable parts are/is greater than a height and/or a thickness of other movable parts.

In some embodiments, the wall driving part includes:

a driving cylinder, where a first end of the driving cylinder is hinged to the vehicle frame; and a swing frame, where a first end of the swing frame is hinged to the vehicle frame, a second end of the swing frame is hinged to the movable part, and a second end of the driving cylinder is hinged to the swing frame.

In some embodiments, the wall driving part further includes a pull rod; a first end of the pull rod is hinged with the vehicle frame; and a second end of the pull rod is hinged with the movable part.

In some embodiments, the protection wall further includes a fixed wall fixedly arranged relative to the vehicle frame.

In some embodiments, the fixed wall and the movable wall are respectively arranged on two sides of the vehicle frame in a second direction; and the second direction is a horizontal direction perpendicular to the first direction.

In some embodiments, the fixed wall includes shielding sections extending in the first direction; and a height and/or a thickness of at least one of the shielding sections are/is greater than a height and/or a thickness of other shielding sections of the fixed wall.

In some embodiments, the movable wall is translatable and/or rotatable.

In some embodiments, the traveling device includes a first supporting wheel and a second supporting wheel;

the first supporting wheel has a touchdown position and a suspended position; at the touchdown position, a bottom edge of the first supporting wheel and a bottom edge of the second supporting wheel have the same height, and the first supporting wheel is in a touchdown state, and the vehicle frame is supported on the first supporting wheel and the second supporting wheel; and at the suspended position, the bottom edge of the first supporting wheel is higher than the bottom edge of the second supporting wheel, and the first supporting wheel is in a suspended state, and the vehicle frame is supported on the second supporting wheel.

In some embodiments, the traveling device includes a connecting frame; the first supporting wheel is connected to the vehicle frame through the connecting frame; and the connecting frame is arranged movably and/or deformably relative to the vehicle frame, and the first supporting wheel is switched between the touchdown position and the suspended position.

In some embodiments, the traveling device includes an overturning driving mechanism which is in driving connection with the connecting frame and configured to drive the connecting frame to rotate relative to the vehicle frame, and the first supporting wheel is switched between the touchdown position and the suspended position.

In some embodiments, the ray protection device further includes a pulling mechanism; and the pulling mechanism is configured to pull the traveling device to travel.

In some embodiments, the pulling mechanism includes a pulling vehicle configured to be connected to the vehicle frame; and/or the pulling mechanism includes a traveling driving device which is in driving connection with the traveling device.

In some embodiments, the ray protection device further includes an electric generator; and the electric generator is arranged on the vehicle frame.

One embodiment of the present disclosure provides a radiation inspection system, having a radiation inspection state and including:

a radiation inspection device, where in the radiation inspection state, a radiation source of the radiation inspection device emits rays to perform radiation inspection on an inspected target; and a ray protection device which is the ray protection device according to the embodiments of the present disclosure, where in the radiation inspection state, the ray protection device and the radiation inspection device are arranged side by side and at intervals on one side of the radiation inspection device emitting rays, and an inspection channel is formed between the radiation inspection device and the ray protection device, and the movable wall is at the shielding position.

In some embodiments, the radiation inspection device is a radiation inspection vehicle; the radiation inspection state includes a mobile inspection state; and in the mobile inspection state, the ray protection device is configured to move synchronously with the radiation inspection vehicle.

In some embodiments, in the mobile inspection state, the ray protection device moves independently of the radiation inspection vehicle; or in the mobile inspection state, the ray protection device moves under the pulling of the radiation inspection vehicle.

The ray protection device provided by the present disclosure can be used with the radiation inspection device to form the radiation inspection system, and the site space required when the radiation inspection system works can be reduced, and the site utilization rate can be increased. Due to the avoidance of a fixed protection wall and the adoption of the movable wall, it is beneficial to reduce the occupied area during transition of the protection wall, rapid transition is facilitated, and there is no special requirements for site construction.

Other embodiments of the present disclosure will become apparent from the following detailed description of exemplary embodiments of the present disclosure with reference to the accompanying drawings.

BRIEF DESCRIPTION OF THE DRAWINGS

Drawings illustrated herein are used for providing further understanding of the present disclosure and form part of the present application, and illustrative embodiments of the present disclosure and description thereof are intended for explaining instead of improperly limiting the present disclosure. In the drawings.

DETAILED DESCRIPTION OF THE DISCLOSURE

Figure 1:
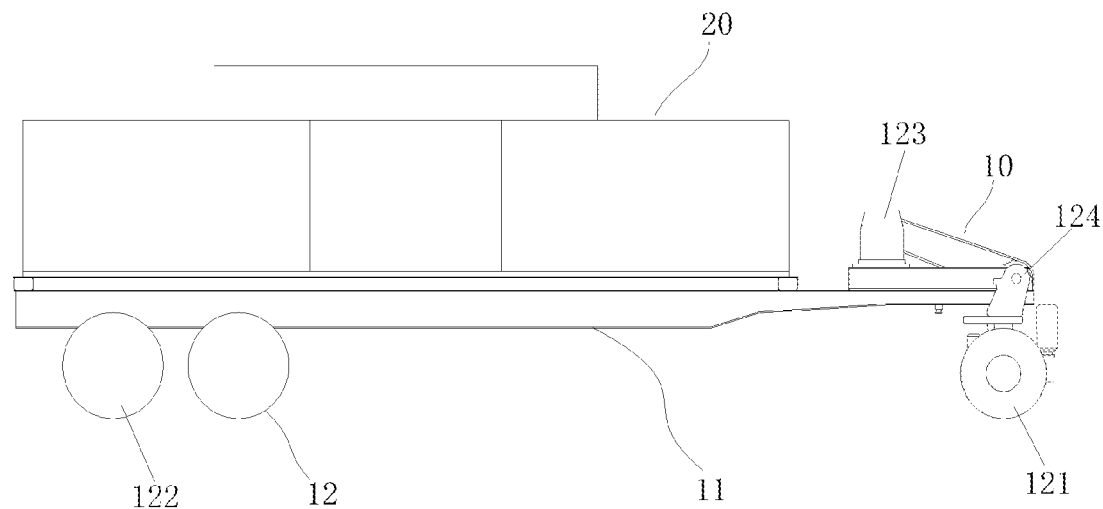
FIG. 1 is a schematic diagram of a side-view structure of a ray protection device according to an embodiment of the present disclosure, where a movable wall is at a retracting position, and a first supporting wheel is at a touchdown position.
Figure 2:
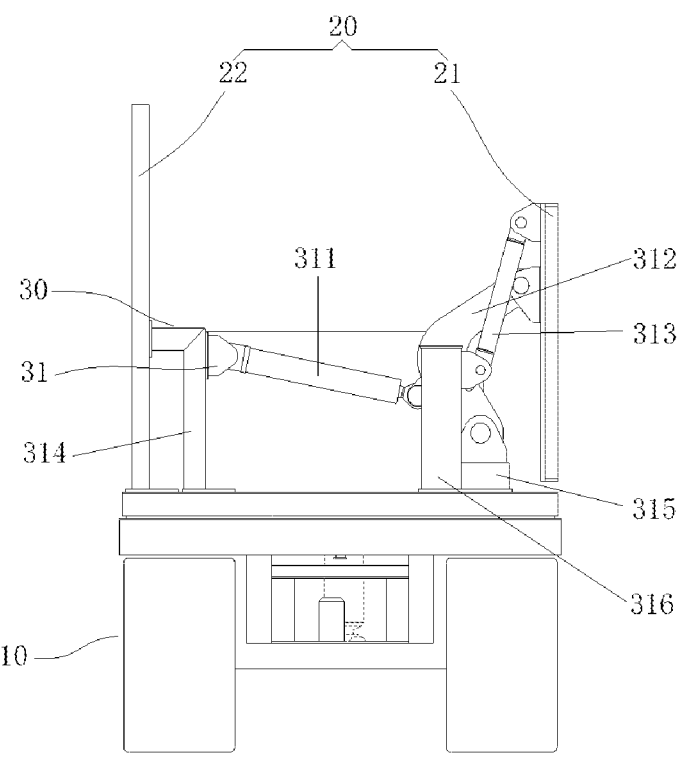
FIG. 2 is a schematic diagram of a rear-view structure of the ray protection device shown in FIG. 1, where a movable wall is at a retracting position, and a first supporting wheel is at a touchdown position.

The embodiments of the present disclosure will be described below clearly and completely in conjunction with the accompanying drawings in the embodiments of the present disclosure. The described embodiments are only part of, instead of all of the embodiments of the present disclosure. The following description of at least one exemplary embodiment is actually only illustrative, and in no way serves as any limitation on the present disclosure and its application or use.

Unless specifically stated otherwise, the relative arrangement of components and steps, numerical expressions and numerical values set forth in these embodiments do not limit the scope of the present disclosure. Furthermore, it should be appreciated that, for ease of description, the sizes of various parts shown in the drawings are not drawn in accordance with actual proportional relationships. Technologies, methods, and devices known in the related art may be not discussed in detail, but where appropriate, the technologies, methods, and equipment should be regarded as part of the specification as granted. In all examples shown and discussed here, any specific value should be interpreted as merely exemplary, rather than as a limitation. Therefore, other examples of an exemplary embodiment may have different values. It should be noted that similar reference numerals and letters denote similar items in the following drawings, so once a certain item is defined in one drawing, it does not need to be further discussed in subsequent drawings.

In the description of the present disclosure, it should be understood that the use of terms such as "first" and "second" to define parts and components is only for the convenience of distinguishing the corresponding parts and components. Unless otherwise stated, the above terms have no special meanings, and therefore cannot be construed as limitations on the protection scope of the present disclosure.

In description of the present disclosure, it should be understood that orientation or position relations denoted by terms are generally orientation or position relations illustrated based on the drawings, and are merely for the convenience of describing the present disclosure and simplifying description, and unless stated to the contrary, such terms do not indicate or imply the denoted devices or elements must have specific orientations or be constructed and operated in specific orientations, and thus cannot be construed as limiting the protection scope of the present disclosure; and orientation terms "inner" and "outer" refer to the inside and outside with respect to the contour of each component itself.

In the following description, "front" refers to a forward direction when a ray protection device travels normally, and corresponds to a horizontal direction pointed by a first direction X in FIG. 1; "rear" refers to one side opposite to "front"; "left" and "right" refer to left and right directions formed when the front is faced; a second direction Y is a horizontal direction perpendicular to the first direction X; and a third direction Z is a vertical direction, also referred to as a height direction.

FIG. 1 to FIG. 6 show structures of a ray protection device according to the embodiments of the present disclosure. As shown in FIG. 1 to FIG. 8, the ray protection device mainly includes a mobile bearing device 10 and a protection wall 20. The mobile bearing device 10 includes a vehicle frame 11 and a traveling device 12 supporting the vehicle frame 11 to drive the vehicle frame 11 to travel in the first direction X. The protection wall 20 is arranged on the vehicle frame 11. The protection wall 20 includes a movable wall 21 which is movable relative to the vehicle frame 11.

As shown in FIG. 1 to FIG. 6, the movable wall 21 has a shielding position and a retracting position. At the shielding position of the movable wall 21, the protection wall 20 has first projection area in a vertical plane parallel to the first direction X; and at the retracting position of the movable wall 21, the protection wall 20 has second projection area in the vertical plane, where the first projection area is larger than the second projection area.

Figure 4:
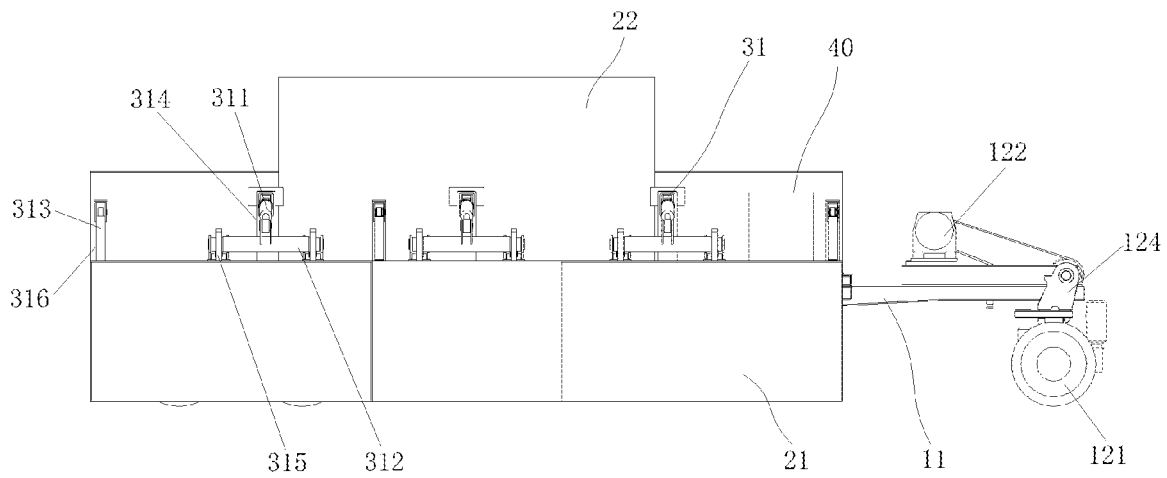
FIG. 4 is a schematic diagram of a side-view structure of the ray protection device shown in FIG. 1, where a movable wall is at a shielding position, and a first supporting wheel is at a touchdown position.

The first projection area corresponds to the area of a visible part of the protection wall 20 shown in FIG. 4. The second projection area corresponds to the area of a visible part of the protection wall 20 shown in FIG. 1 and FIG. 6.

The ray protection device according to the embodiments of the present disclosure can be used with the radiation inspection device, and the site space required when the radiation inspection system works can be reduced, and the site utilization rate can be increased. Further, due to the avoidance of a fixed protection wall and the adoption of the movable wall, it is beneficial to reduce the occupied area during transition of the protection wall, rapid transition is facilitated, and there are no special requirements for site construction.

As shown in FIG. 2 to FIG. 5, in some embodiments, the ray protection device further includes a wall driving device 30; the wall driving device 30 includes a wall driving part 31 which is mounted on the vehicle frame 11 and in driving connection with the movable wall 21; and the wall driving part 31 is configured to drive the movable wall 21 to switch between the shielding position and the retracting position.

The wall driving device 30 is configured to drive the movable wall 21 to switch positions, which is beneficial for the movable wall 21 to rapidly and accurately switch positions and is more suitable for the situation where the weight and size of the movable wall 21 are large. A power source of the wall driving device 30, for example, may include an electric motor, a hydraulic cylinder, a pneumatic cylinder and the like.

As shown in FIG. 1 to FIG. 6, in some embodiments, the movable wall 21 includes two or more movable parts 211; the wall driving device 30 includes two or more wall driving parts 31 arranged corresponding to the two or more movable parts 211; and each of the wall driving parts 31 drives the corresponding movable part 211 to act.

In the embodiments shown in FIG. 1 to FIG. 6, the movable parts 211 of the movable wall 21 are in one-to-one correspondence with the wall driving parts 31 of the wall driving device 30. In the embodiments not shown in the figures, the number of the movable parts 211 and the number of the wall driving parts 31 are not limited to this. For example, each of the movable parts 211 may be provided with a corresponding number of wall driving parts as required, such as two or three or more wall driving parts.

In the embodiments shown in FIG. 1 to FIG. 6, the wall driving parts 31 has a same form, and the movable parts 211 of the movable wall 21 have a same motion form. In the embodiments not shown in the figures, the wall driving parts corresponding to the movable parts may switch the positions of the movable parts by using the driving parts with different principles and different structures.

Figure 3:
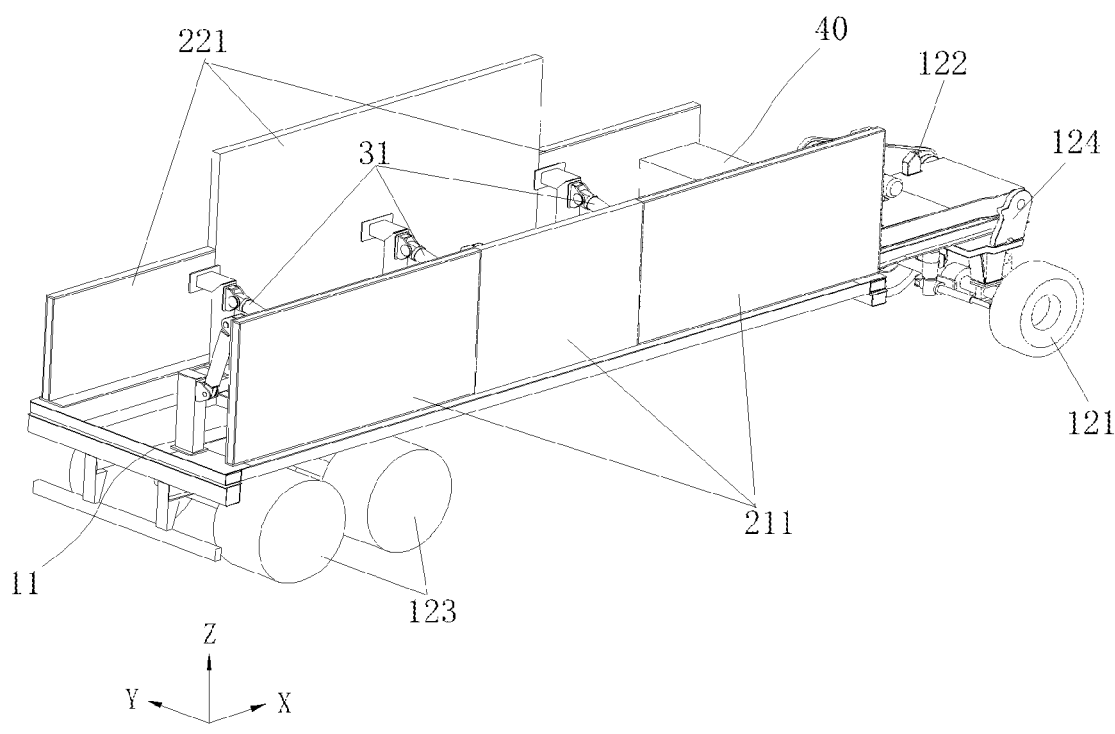
FIG. 3 is a schematic diagram of a three-dimensional structure of the ray protection device shown in FIG. 1, where a movable wall is at a retracting position, and a first supporting wheel is at a touchdown position.
Figure 5:
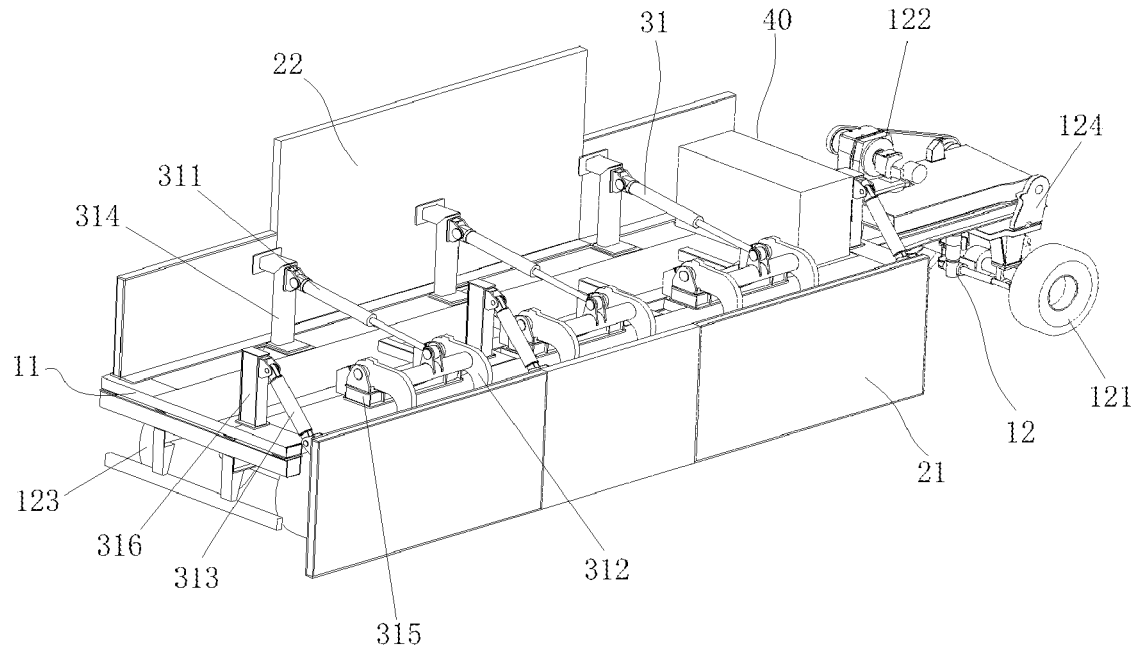
FIG. 5 is a schematic diagram of a three-dimensional structure of the ray protection device shown in FIG. 1, where a movable wall is at a shielding position, and a first supporting wheel is at a touchdown position.
Figure 6:
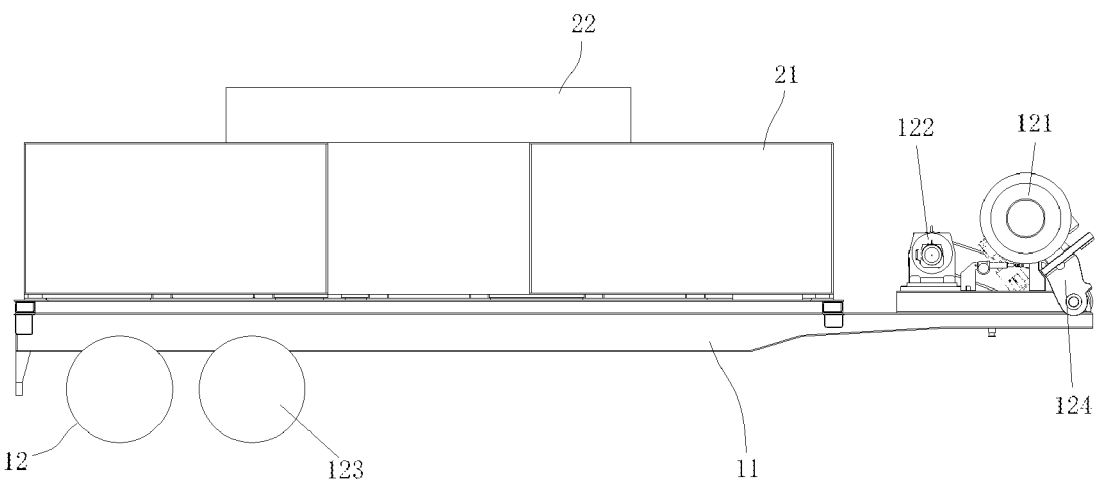
FIG. 6 is a schematic diagram of a side structure of the ray protection device shown in FIG. 1, where a movable wall is at a retracting position, and a first supporting wheel is at a suspended position.

In the embodiments shown in FIG. 1 to FIG. 6, the movable wall 21 includes three movable parts 211, where each of the movable parts 211 is arranged in sections in the first direction X; and at the retracting position and the shielding position shown in FIG. 3 to FIG. 5, the movable parts 211 have a same height.

Movable parts 211 and corresponding driving parts 31 are provided, which is more suitable for the situation where the weight and size of the movable wall 21 are large and is beneficial to driving the movable wall by a low-power power source. A material and/or a size of each of the movable parts 211 may be set reasonably according to the protection requirement of each part, to reduce the cost and/or the weight on the basis of meeting the protection requirement. For example, the movable wall 21 may include two or more movable parts 211 extending in the first direction X; and a height and/or a thickness of at least one movable part 211 are/is greater than a height/or a thickness of other movable parts 211.

As shown in FIG. 2 to FIG. 5, in some embodiments, the wall driving part 31 includes a driving cylinder 311 and a swing frame 312. A first end of the driving cylinder 311 is hinged to the vehicle frame 11. A first end of the swing frame 312 is hinged to the vehicle frame 11, a second end of the swing frame 312 is hinged to the movable part 211, and a second end of the driving cylinder 311 is hinged with the swing frame 312.

Through the cooperation of the swing frame 312 and the driving cylinder 311, the movable wall 21 may have a large variation amplitude in the height direction (the third direction Z), and may not move or may have a small motion amplitude in the first direction X and the second direction Y.

As shown in FIG. 4 and FIG. 5, in some embodiments, to make the movable wall 21 more stable in position change, the swing frame includes two swing arms arranged side by side, and the two swing arms are fixedly connected through a connecting rod. A first end of each of the swing arms is hinged with the vehicle frame 11, and a second end of each of the swing arms is hinged with the corresponding movable part. A second end of the driving cylinder 311 and the swing frame 312 are hinged on the connecting rod.

In addition, a first supporting frame 314 and a second supporting frame 315 are fixedly mounted on the vehicle frame 11. A first end of the driving cylinder 311 is hinged with the first supporting frame 314 to be hinged with the vehicle frame 11. The swing frame 312 is hinged with the second supporting frame 315 to be hinged with the vehicle frame 11. According to this arrangement, the hinged point of the driving cylinder 311 and the vehicle frame 11 and the hinged point of the swing frame 312 and the vehicle frame 11 are at an optimal position, to better adapt to the position change range of the movable wall 21.

As shown in FIG. 2 to FIG. 5, in some embodiments, the wall driving part 31 further includes a pull rod 313, a first end of the pull rod 313 is hinged with the vehicle frame 11, and a second end of the pull rod 313 is hinged with the movable part 211.

The pull rod 313 may limit the freedom of motion of the movable part 211. In particular, when a hinged axis of the pull rod 313 and the movable part 211 is parallel to, but not coaxial with a hinged axis of the swing frame 312 and the movable part 211, the moving path of the movable part 211 is more controllable, and the movable wall 21 is more stable at the retracting position and the shielding position. For example, in the embodiments shown in FIG. 1 to FIG. 6, through the cooperation of the swing frame 312, the driving cylinder 311 and the pull rod 313, the movable wall 21 may have a large variation amplitude in the height direction (the third direction Z), and may not move or may have a small motion amplitude in the first direction X and the second direction Y.

As shown in FIG. 2 to FIG. 5, in some embodiments, a third supporting frame 316 is fixedly mounted on the vehicle frame 11. A first end of the pull rod 313 is hinged with the third supporting frame 316 to be hinged with the vehicle frame 11. According to this arrangement, the hinged point of the pull rod 313 and the vehicle frame 11 is at an optimal position, to better adapt to the position change range of the movable wall 21.

As shown in FIG. 1 to FIG. 6, in some embodiments, a height of the movable wall 21 at the shielding position is less than a height at the retracting position. In one embodiment, at the shielding position, at least one part of the movable wall 21 is located below the vehicle frame 11; and at the retracting position, the movable wall 21 is located above the vehicle frame 11. According to this arrangement, the ray protection device has larger shielding area at the shielding position, and can travel on the road conveniently during transportation.

As shown in FIG. 1 to FIG. 6, the protection wall 20 further includes a fixed wall 22 fixedly arranged relative to the vehicle frame 11. The fixed wall 22 is provided, and only part of the protection wall 20 can be changed in position according to work requirements, to reduce the number and/or power of driving devices for driving the protection wall to deform and simplifying the operation.

As shown in FIG. 1 to FIG. 6, in some embodiments, the fixed wall 22 and the movable wall 21 are respectively arranged on two sides of the vehicle frame 11 in the second direction Y, that is, located on a left side and a right side of the vehicle frame 11, where the second direction Y is a horizontal direction perpendicular to the first direction X.

In the embodiments shown in FIG. 1 to FIG. 6, the movable wall 21 is located on the right side of the vehicle frame 11, and the fixed wall 22 is located above the left side of the vehicle frame 11. The fixed wall 21 is always unchanged in position and is still located above the vehicle frame 11; and at the retracting position of the movable wall 21, the movable wall 21 is also located above the vehicle frame 11, and the projection area (corresponding to the second projection area) in the vertical plane parallel to the first direction X is small. In the process of moving the movable wall 21 from the retracting position to the shielding position shown in FIG. 4, the movable wall 21 is driven by the wall driving device 30 to avoid the vehicle frame 11 and then move downwards, the projection area in the vertical plane parallel to the first direction X is increased gradually, and the projection area (corresponding to the first projection area) at the position shown in FIG. 4 reaches a maximum.

It should be noted that the shielding position of the movable wall 21, for example, may be the position of the movable wall shown in FIG. 4, but the number of the shielding positions is not limited to one, or may be multiple, for example, one or more positions between the retracting position of the movable wall 21 and the position of the movable wall shown in FIG. 4 may also be the shielding position, as long as the positions where a protection parameter of the protection wall meets the shielding requirement required by the matched radiation inspection device may serve as the shielding positions.

As shown in FIG. 1 to FIG. 6, in some embodiments, the fixed wall 22 includes shielding sections extending in the first direction X, and a height of at least one shielding section is greater than a height of other shielding sections of the fixed wall 22. In one embodiment, at least one shielding section with the height greater than that of other shielding sections of the fixed wall 22 is located in the middle of the fixed wall 22. In the embodiments shown in FIG. 1 to FIG. 6, the fixed wall 22 includes shielding sections arranged in the first direction X, where the height of the shielding section located in the middle is greater than that of the shielding sections located at two ends. During use, the shielding sections may be opposite to a part of the radiation inspection device emitting rays, and the protection of key positions requiring protection can be enhanced. Therefore, the shielding sections are arranged in sections, and a material and/or a size of each shielding section can be set reasonably according to the protection requirement of each part, to reduce the cost and/or the weight on the basis of meeting the protection requirement.

As shown in FIG. 2 to FIG. 5, in some embodiments, a bottom of the fixed wall 22 is fixedly connected to the vehicle frame 11, and a side part is fixedly connected to the first supporting frame 314. This arrangement can enhance the connection stability of the fixed wall 22 and the vehicle frame 11.

In the embodiments shown in FIG. 1 to FIG. 6, in the process of switching between the retracting position and the shielding position, the movable wall 21 performs composite motion of rotating while translating. In the embodiments not shown in the figures, the movable wall 21 can be switched between the retracting position and the shielding position only through a translating motion, only through a rotating motion, or through a time-sharing translating and rotating motion.

In the embodiments shown in FIG. 1 to FIG. 6, walls of the protection wall are respectively arranged on the left side and the right side of the vehicle frame 11, but in the embodiments not shown in the figures, the walls of the protection wall may also be arranged on the same side of the vehicle frame.

As shown in FIG. 1 to FIG. 6, the traveling device 12 includes a first supporting wheel 121 and a second supporting wheel 123. The first supporting wheel 121 has a touchdown position and a suspended position. At the touchdown position, a bottom edge of the first supporting wheel 121 and a bottom edge of the second supporting wheel 123 have a same height, and the first supporting wheel 121 is in a touchdown state, and the vehicle frame 11 is supported on the first supporting wheel 121 and the second supporting wheel 123. At the suspended position, the bottom edge of the first supporting wheel 121 is higher than the bottom edge of the second supporting wheel 123, and the first supporting wheel 121 is in a suspended state, and the vehicle frame 11 is supported on the second supporting wheel 123.

As shown in FIG. 1 to FIG. 7, the traveling device 12 includes a connecting frame 124, the first supporting wheel 121 is connected to the vehicle frame 11 through the connecting frame 124, and the connecting frame 124 is movably and/or deformably arranged relative to the vehicle frame 11, and the first supporting wheel 121 is switched between the touchdown position and the suspended position.

In the embodiments shown in FIG. 1 to FIG. 7, the connecting frame 124 is turnably arranged relative to the vehicle frame 11 to drive the first supporting wheel 121 to switch between the touchdown position and the suspended position. In the embodiments not shown in the figures, the connecting frame may drive the first supporting wheel 121 through translation or other deformations such as extending and retracting and folding to switch between the touchdown position and the suspended position.

As shown in FIG. 1 to FIG. 7, the traveling device 12 includes an overturning driving mechanism 122; and the overturning driving mechanism 122 is in driving connection with the connecting frame 124, and is configured to drive the connecting frame 124 to rotate relative to the vehicle frame 11, and the first supporting wheel 121 is switched between the touchdown position and the suspended position.

The overturning driving mechanism 122, for example, includes a motor and a transmission device, and the motor is connected to the connecting frame 124 through the transmission device. In the embodiments shown in FIG. 1 to FIG. 7, the transmission device includes a first chain wheel connected to an output shaft of the motor, a second chain wheel connected to a rotating shaft of the connecting frame 124, and a transmission chain connected between the first chain wheel and he second chain wheel, the motor drives the first chain wheel to rotate, and the rotating shaft of the connecting frame 124 is driven by the transmission chain and the second chain wheel to rotate, to drive the connecting frame 124 to rotate.

The overturning driving mechanism 122 may also adopt other driving modes, for example, may take a motor or an oil cylinder as a power source, and adopt a rack and pinion mechanism, a gear transmission mechanism, a connecting rod mechanism and other transmission mechanisms to realize the corresponding action of the connecting frame to switch the positions of the first supporting wheel.

Figure 7:
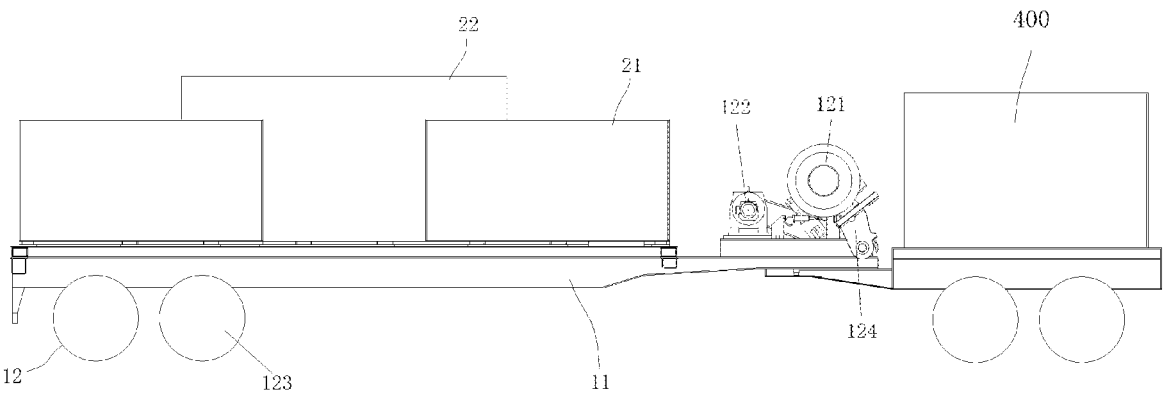
FIG. 7 is a schematic diagram of a side-view structure of a ray protection device including a pulling vehicle according to an embodiment of the present disclosure, where a movable wall is at a retracting position, and a first supporting wheel is at a suspended position.

As shown in FIG. 7, the ray protection device further includes a pulling mechanism, and the pulling mechanism is configured to pull the traveling device 12 to travel. The pulling mechanism may drive the ray protection device to travel to enlarge the protection range of the ray protection device and improve the work flexibility.

As shown in FIG. 7, the pulling mechanism includes a pulling vehicle 400 configured to be connected to the vehicle frame 11. When the pulling vehicle 400 is connected to the vehicle frame 11, the first supporting wheel 121 is turned up to be at a suspended position to avoid a part of the pulling vehicle 400 connected to the vehicle frame 11.

In the embodiments not shown in the figures, the pulling mechanism may include a traveling driving device which is in driving connection with the traveling device. For example, at least one part of supporting wheels of the traveling device may be driving wheels, and the traveling driving device is in driving connection with the driving wheels to drive the driving wheels to rotate, to make the traveling device drive the ray protection device to move. The traveling driving device, for example, may include a driving motor.

Of course, the pulling mechanism may also include a pulling vehicle and a traveling driving device to select a driving mode of driving the ray protection device to move as required.

As shown in FIG. 3 to FIG. 5, the ray protection device further includes an electric generator 40, and the electric generator 40 is arranged on the vehicle frame 11. At the retracting position of the movable wall 21, the electric generator 40 is located between the movable wall 21 and the fixed wall 22 in the second direction, and the electric generator 40 is invisible from the left side and the right side. The electric generator 40 may provide original power for each power source of the ray protection device, for example, may provide electric power to a motor for providing hydraulic oil to the driving cylinder 311 and to a motor for driving the connecting frame 124 to provide overturning power.

Figure 8:
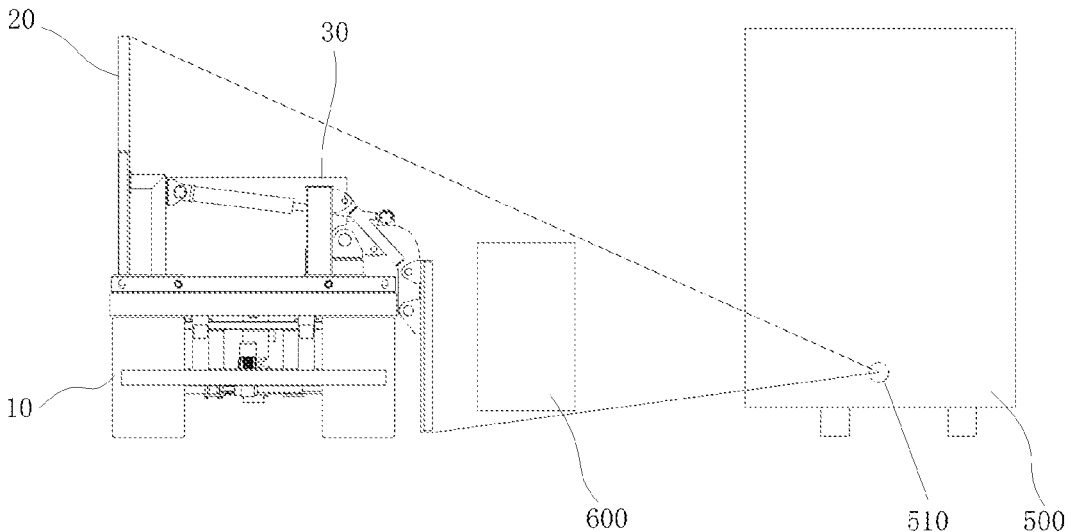
FIG. 8 is a schematic diagram of a radiation inspection system according to an embodiment of the present disclosure.

As shown in FIG. 8, the embodiments of the present disclosure further provide a radiation inspection system, having a radiation inspection state and including a radiation inspection device 500 and the ray protection device according to the embodiments of the present disclosure. In the radiation inspection state, a radiation source 510 of the radiation inspection device 500 emits rays to perform radiation inspection on an inspected target 600, the ray protection device and the radiation inspection device 500 are arranged side by side and at intervals on one side of the radiation inspection device 500 emitting rays, and an inspection channel is formed between the radiation inspection device 500 and the ray protection device, and the movable wall 21 is at the shielding position.

Rays which are emitted by the radiation inspection device 500 and may cross the inspection channel are shielded by the ray protection device, and excessive sites are not required to reduce the ray radiation by the site space span to ensure the personnel safety, to reduce the sites occupied by the radiation inspection system.

The radiation inspection device 500 includes a radiation source 510 and a detector, and may further include a controller, a display, an alarm device, a sensor for detecting the position of the inspected target 600 and the like, and may further include a transportation vehicle to form a radiation inspection vehicle. The radiation inspection device 500 may include a transmission inspection unit and/or a back scattering inspection unit.

In some embodiments, the radiation inspection device 500 is a radiation inspection vehicle, and the radiation inspection state includes a mobile inspection state. In the mobile inspection state, the ray protection device is configured to move synchronously with the radiation inspection vehicle. This arrangement is beneficial for the ray protection device to track the position of the radiation inspection vehicle during inspection, and the ray protection device may be kept at an optimal protection position, and a ray protection function can be achieved better; and it is unnecessary to set excessively large protection wall area, and the radiation inspection vehicle can perform ray protection in the whole radiation inspection process during movement.

In some embodiments, in the mobile inspection state, the ray protection device may move independently of the radiation inspection vehicle, for example, may be driven by the pulling mechanism which the ray protection device is provided with, or may be pulled by the radiation inspection vehicle to move. The setting mode that the ray protection device is pulled by the radiation inspection vehicle to move is beneficial to keep the moving synchronization of the ray protection device and the radiation inspection vehicle, and a dedicated pulling mechanism does not be required for the ray protection device.

According to the above description, the ray protection device and the radiation inspection system provided by the embodiments of the present disclosure have at least one of the following embodiments: the sites occupied when the radiation inspection system works can be reduced, and the site utilization rate can be increased, the safety protection level of operators, drivers and passengers can be increased; rapid transition of the ray protection device is facilitated; and the occupied area of the protection wall is reduced when the movable wall is at the retracting position, to facilitate storage and transportation.

Finally, it should be noted that the above embodiments are only used for describing rather than limiting the present disclosure. Although the present disclosure is described in detail with reference to the some embodiments, modifications to the specific implementations in the present disclosure or make equivalent substitutions thereof; and such modifications and equivalent substitutions should be encompassed within the embodiments sought for protection in the present disclosure.

What is claimed is:

1. A ray protection device, comprising:
a mobile bearing device, comprises a vehicle frame and a traveling device supporting the vehicle frame to drive the vehicle frame to travel in a first direction; and
a protection wall, arranged on the vehicle frame and comprising a movable wall which is movable relative to the vehicle frame and has a shielding position and a retracting position; wherein at the shielding position of the movable wall, the protection wall has first projection area in a vertical plane parallel to the first direction, and at the retracting position of the movable wall, the protection wall has second projection area in the vertical plane; and wherein the first projection area is larger than the second projection area.

2. The ray protection device according to claim 1, further comprising a wall driving device; wherein the wall driving device comprises a wall driving part which is mounted on the vehicle frame and in driving connection with the movable wall, and the wall driving part is configured to drive the movable wall to switch between the shielding position and the retracting position.

3. The ray protection device according to claim 2, wherein the movable wall comprises two or more movable parts; the wall driving device comprises two or more wall driving parts arranged corresponding to the two or more movable parts; and each of the wall driving parts drives the corresponding movable part to act.

4. The ray protection device according to claim 3, wherein the movable wall comprises two or more movable parts extending in the first direction; and a height and/or a thickness of at least one of the movable parts are greater than a height and/or a thickness of other one of the movable parts.

5. The ray protection device according to claim 2, wherein the wall driving part comprises:
a driving cylinder, where a first end of the driving cylinder is hinged to the vehicle frame; and
a swing frame, where a first end of the swing frame is hinged to the vehicle frame, a second end of the swing frame is hinged to the movable part, and a second end of the driving cylinder is hinged to the swing frame.

6. The ray protection device according to claim 5, wherein the wall driving part further comprises a pull rod; a first end of the pull rod is hinged with the vehicle frame; and a second end of the pull rod is hinged with the at least one of the movable part.

7. The ray protection device according to claim 1, wherein the protection wall further comprises a fixed wall fixedly arranged relative to the vehicle frame.

8. The ray protection device according to claim 7, wherein the fixed wall and the movable wall are respectively arranged on two sides of the vehicle frame in a second direction; and the second direction is a horizontal direction perpendicular to the first direction.

9. The ray protection device according to claim 7, the fixed wall comprises a plurality of shielding sections extending in the first direction; and a height and/or a thickness of at least one of the shielding sections are greater than a height and/or a thickness of other shielding sections of the fixed wall.

10. The ray protection device according to claim 1, wherein the movable wall is translatable and/or rotatable.

11. The ray protection device according to claim 1, wherein
the traveling device comprises a first supporting wheel and a second supporting wheel;
the first supporting wheel has a touchdown position and a suspended position; at the touchdown position, a bottom edge of the first supporting wheel and a bottom edge of the second supporting wheel have the same height, so that the first supporting wheel is in a touchdown state, and the vehicle frame is supported on the first supporting wheel and the second supporting wheel; and at the suspended position, the bottom edge of the first supporting wheel is higher than the bottom edge of the second supporting wheel, so that the first supporting wheel is in a suspended state, and the vehicle frame is supported on the second supporting wheel.

12. The ray protection device according to claim 11, wherein the traveling device comprises a connecting frame; the first supporting wheel is connected to the vehicle frame through the connecting frame; and the connecting frame is arranged movably and/or deformably relative to the vehicle frame, so that the first supporting wheel is switched between the touchdown position and the suspended position.

13. The ray protection device according to claim 12, wherein the traveling device comprises an overturning driving mechanism which is in driving connection with the connecting frame and configured to drive the connecting frame to rotate relative to the vehicle frame, so that the first supporting wheel is switched between the touchdown position and the suspended position.

14. The ray protection device according to claim 1, further comprising a pulling mechanism configured to pull the traveling device to travel.

15. The ray protection device according to claim 14, wherein
the pulling mechanism comprises a pulling vehicle configured to be connected to the vehicle frame; and/or
the pulling mechanism comprises a traveling driving device which is in driving connection with the traveling device.

16. The ray protection device according to claim 1, further comprising an electric generator arranged on the vehicle frame.

17. A radiation inspection system, having a radiation inspection state and comprising:
a radiation inspection device, wherein in the radiation inspection state, a radiation source of the radiation inspection device emits rays to perform radiation inspection on an inspected target; and
a ray protection device which is the ray protection device according to claim 1, wherein in the radiation inspection state, the ray protection device and the radiation inspection device are arranged side by side and at intervals on one side of the radiation inspection device emitting rays, so that an inspection channel is formed between the radiation inspection device and the ray protection device, and the movable wall is at the shielding position.

18. The radiation inspection system according to claim 17, wherein the radiation inspection device is a radiation inspection vehicle; the radiation inspection state comprises a mobile inspection state; and in the mobile inspection state, the ray protection device is configured to move synchronously with the radiation inspection vehicle.

19. The radiation inspection system according to claim 18, wherein in the mobile inspection state, the ray protection device moves independently of the radiation inspection vehicle; or in the mobile inspection state, the ray protection device moves under the pulling of the radiation inspection vehicle.

* * * * *